FIG. I

INVENTOR
GABRIEL V. DE LIZASOAIN

Feb. 9, 1971 G. V. DE LIZASOAIN 3,561,157
FROST PREVENTION METHOD AND APPARATUS
Filed Sept. 29, 1967 3 Sheets-Sheet 2

INVENTOR
GABRIEL V. DE LIZASOAIN

BY *Townshend & Meserole*

ATTORNEYS.

FIG. 4
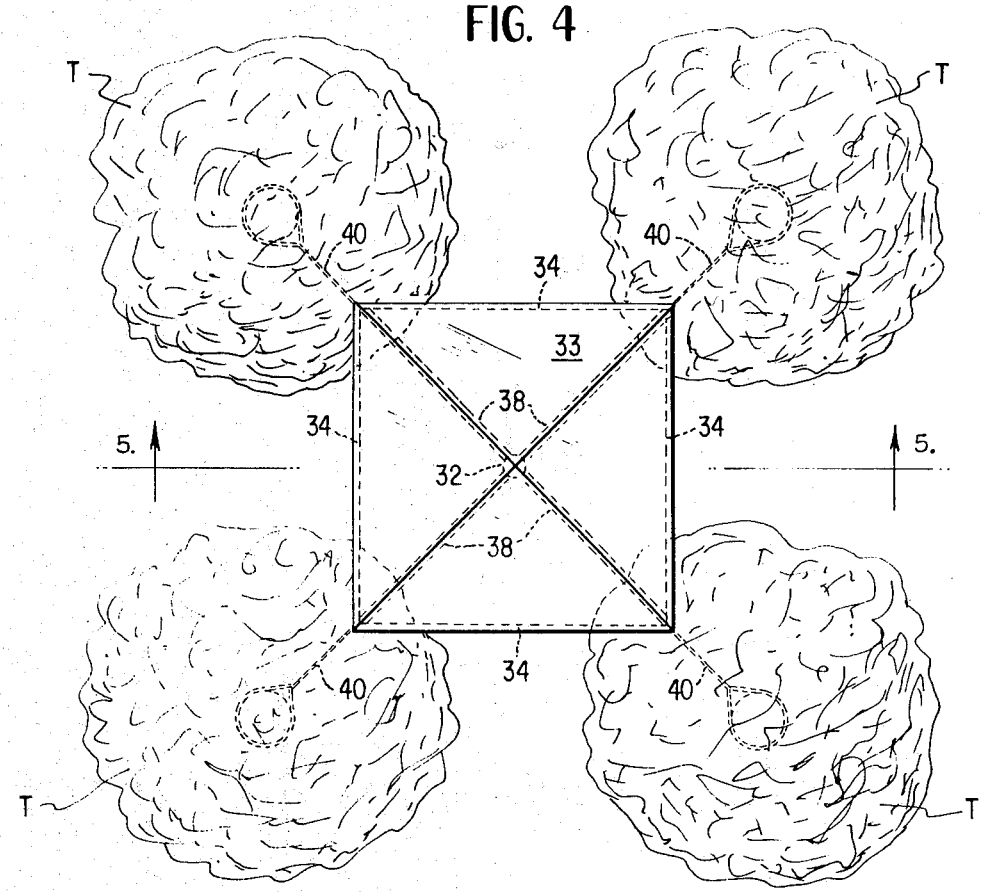
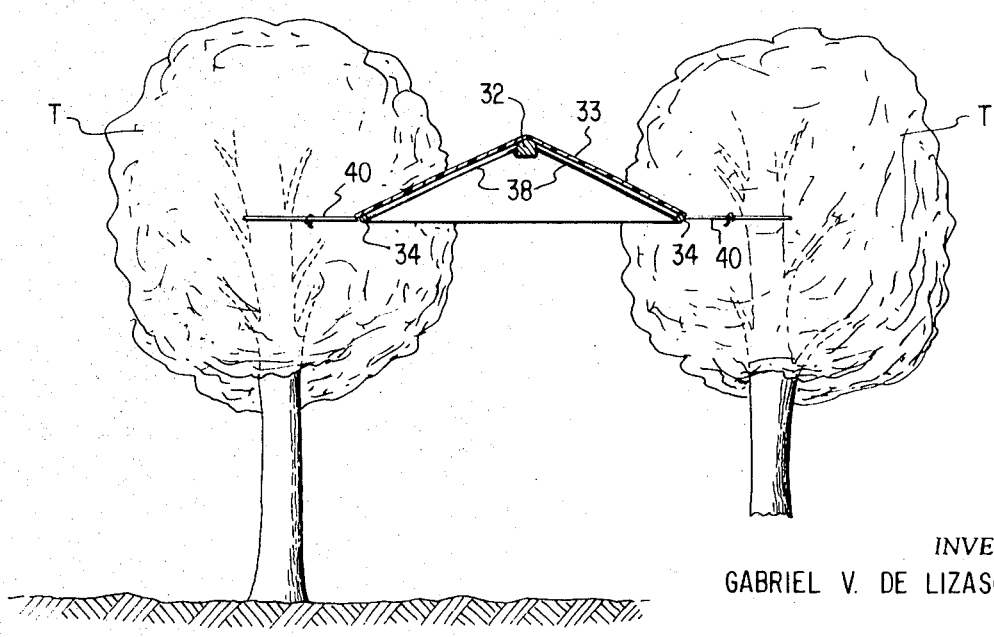
FIG. 5
INVENTOR
GABRIEL V. DE LIZASOAIN
BY Townshend & Meserole
ATTORNEYS

United States Patent Office 3,561,157
Patented Feb. 9, 1971

3,561,157
FROST PREVENTION METHOD AND APPARATUS
Gabriel V. de Lizasoain, Rockville, Md., assignor to Tecnico, Inc., Washington, D.C., a corporation of the District of Columbia
Filed Sept. 29, 1967, Ser. No. 671,780
Int. Cl. A01g *13/06*
U.S. Cl. 47—2                                                    5 Claims

ABSTRACT OF THE DISCLOSURE

Heat radiated from the sun and absorbed by the air and ground within the confines of an orchard is utilized during periods of freeze by a "greenhouse" effect which keeps the ambient air within the orchard at a temperature that prevents frost damage.

BACKGROUND

The present invention relates to the art of plant husbandry, and particularly to methods and apparatus for preventing the formation of frost in orchards.

Freeze conditions in orchard and fruit growing areas occur and are brought about by specific meterological occurrences. First, the intrusion of one or several masses of cold air has reduced the local daytime average ambient temperatures to within 20 to 30° F. or less of the freezing point (or dew point). Normally, since the cold mass is the result of a shifting high barometric pressure mass of air, the atmosphere remains relatively clear and cloudless. These conditions, with the onset of darkness, cause a rapid loss of ambient air temperature through convection and radiation. A freeze, less frequently, can also occur under cloudy sky conditions, even though radiation heat loss is minimal in a dense cloud cover, if the cold mass of air is particularly cold at its fringes and has sufficient impetus to bodily intrude in the area. This results in an atmospheric layer inversion with the cold air settling like a blanket close to the ground and displacing the warmer air to higher strata.

Prior art frost prevention methods and apparatus frequently employ portable heaters dispersed throughout an orchard in proximity to the trees to warm the air in their vicinity and establish an ambient air temperature that prevents formation of frost. The efficiency of such devices is low because they can only heat the air in their immediate vicinity.

Furthermore, heater devices are principally intended to replace the ambient heat loss, but if kept within any reasonable cost, are unable to offset the high heat loss rate prevalent in hard frost conditions.

Other systems use so-called "wind machines" either by themselves or in combiantion with the aforementioned portable heaters. In conjunction with the heaters, these "wind machines" help distribute within the orchard the offsetting heat generated by the heaters. Alternately, under the mentioned meterological conditions wherein a layer or mass of cold air has settled in the geographical area, these wind machines are used to circulate this mass of air and/or mix it with the warmer layers that have been displaced to higher strata.

All systems that require consumption of fuel, use of electricity, or machine operation are costly to install and service.

Some frost prevention measures employed in the prior art are based on the utilization of ground and air stored solar heat. One type of such device, of which U.S. Pat. Nos. 994,083 and 2,953,870 are representative, uses a hood or covering individual to each tree and encasing its foliage so that the air rising from the ground area immediately underlying the overhand of the foliage is caught and held in contact with the foliage as it passes slowly up through a vent in the top of the casing. Another type, represented by U.S. Pat. No. 3,140,563, encases the entire orchard in a cover extending over the tops of the trees; trapping all the ground and air heat and making a greenhouse of the entire orchard.

During daylight a large amount of sun heat is stored in the air mass and ground surface within the confines of an orchard. During the night this stored heat is given off under frost conditions, and is lost by direct radiation and by rising by convection through the foliage of the trees and the spaces between them and escaping to the atmosphere above the trees.

Approximately fifty percent of the ground surface of an orchard is exposed to sunlight falling directly thereon sometime during the day, and those areas of the ground which are longest exposed naturally are heated to a temperature considerably above the temperature over those areas which lie directly beenath the foliage of the trees. The air above the unshaded higher heat areas rises vertically in strong thermal currents which reach their greatest velocity and volume over the centers of the empty open spaces in those areas having their centers substantially equidistant from the nearest four trees.

Conventional orchard layout places the trees in intersecting parallel rows and spaced apart a distance sufficient to provide lanes which permit passage of tractors and other wheeled vehicles; leaving large open spaces at the intersections of the lanes. These intersection spaces are more exposed to sun rays and for longer periods than any other ground areas in an orchard and are heated to a temperature much higher than those areas which underlie the foliage of the trees, thus forming hot spots which generate strong upward thermal currents of heated air that rise rapidly through the empty spaces between the trees.

The normally unimpeded air above these open hot spots is at a higher temperature and rises at a velocity and volume much higher than the relatively cooler air which rises through the foliage of the trees from the ground immediately beneath the overhang of the foliage. In consequence, the major portion of the air beneath the trees is sucked up by the fast rising thermal currents above the open space hot spots, instead of rising through the foliage.

The principle upon which most of the aforesaid methods and apparatus operate is the utilization of ground and air stored solar heat. However, the teaching of the art prior to the advent of my invention leads away from the most efficient application of the principle, in that it fails to take advantage of the large amount of heat contained in the hot air that rises through the empty spaces between the trees, and fails to prevent intrusion of cold air masses through the same route.

SUMMARY

The subject matter herein disclosed is my discovery of a method and means by which the amount of air and ground absorbed solar heat normally present in an orchard conventional to the fruit growing industry can be made sufficient to maintain within such an orchard during fortuitous periods of freeze, and without the use of orchard enclosing covers, artificial heat generators, or wind machines, an ambient air temperature high enough to prevent frost damage to the trees and their foliage throughout the duration of the freeze.

I have discovered that by placing barriers across the normally empty spaces between the trees above the aforesaid hot spot ground areas at a height approximately two-thirds the height of the trees, or preferably slightly above the point of maximum branch girth, the heated air which normally rises through the empty spaces and escapes into the atmosphere above the trees without contacting their foliage can be trapped and diverted laterally so that it penetrates the foliage and is caused to rise slowly therethorugh due to the retarding effect of the foliage.

These barriers, hereinafter described, together with the tree foliage, so retard the rise of air from the ground that the air backs up and diffuses throughout the confines of the orchard as a dense layer at a temperature which prevents the formation of frost at any level below the tops of the trees. The frost inhibiting layer dissipates very slowly and will outlast almost any periods of freeze encountered in deciduous fruit orchards, which seldom exceed forty-eight hours.

Thus, by harnessing and using the strong upward thermal currents of sun heated air which prior art practice has wasted by allowing its unimpeded escape upward through empty spaces between the trees, I am able to maintain the ambient air within the confines of an orchard at a frost preventing temperature during periods of freeze, by conserving and using the large amount of heat in air that would otherwise be lost, and without enclosing the entire orchard beneath a cover rigged on a frame above the tops of the trees.

At the same time, these barriers combine with the foliage to achieve over eighty percent ground coverage, and therefore, also impede frost damage from descending cold masses of air.

It is to be noted that under the present invention the fruit and portion of the plant protruding above the barriers is fully protected by the thermal updraft diverted from the hot spaces between the trees and rising through the foliage.

In an experiment conducted to test the efficacy of my invention, thermal current barriers of the type hereinafter described in detail were installed in two separate orange groves of approximately one-half acre each on the day preceding a predicted freeze. The installation in the first grove was made between 9 and 11:30 a.m. At that time the ambient air temperature was 51° F. In the second grove the barriers were installed at approximately 3 p.m. At that time the ambient air temperature had dropped to 49° F.

The particular freeze during which the experiment was conducted was due to a mass of cold air aloft and an inversion of the same which caused a blanket of freezing ambient air to settle in the region of the groves. In the area outside the barrier-protected groves full freeze conditions were attained at 2:30 a.m. and the lowest temperature, 24° F. was recorded at approximately 3:30 a.m. Recordings of ambient air temperature within the confines of the groves had been started at midnight and were taken through 4 a.m. However, in the afternoon preceding the freeze the temperature within the first grove, in which the barriers were installed in the morning, was a great deal higher than that outside the grove and was estimated at about 85–85° F.

At midnight, when first readings were taken, the ambient air temperature within the first grove remained at about 70–71° F., and in the second grove it was 43° F., a drop of only three degrees since installation of its barriers around 3 p.m.

Outside the protected groves the lowest temperature, 24° F., was recorded at 3:30 a.m. At this point the lowest temperature was also recorded in the protected groves. In the first grove, protected since morning, the temperature of the ambient air averaged 58–60° F., and in the second grove, protected since afternoon, the temperature oscillated between 39 and 40° F. Taking into account the fact that the air outside the groves was six degrees below freezing, while the air within the barrier-protected groves was never at any time less than seven degrees above freezing—a differential of fifteen degrees—the result is amazing.

On the second and last night of the freeze both protected groves gave an ambient air temperature of 50° F. at midnight while the air temperature outside the groves stood at 29° F. The temperature in the groves during the night remained in the 40's.

Some measurements were made of the temperature of air within and in the immediate vicinity of those portions of the trees which were above the level of the barriers. This temperature remained within an average of four to five degrees lower than the temperature below the level of the barriers, but well above freezing point and with a high differential from outside ambient air.

DRAWINGS

FIG. 4 is a top plan view generally similar to FIG. 1 but illustrating still another alternative embodiment of the barrier structure.

FIG. 5 is a sectional view on line 5—5 of FIG. 4.

DESCRIPTION

Figure 1:
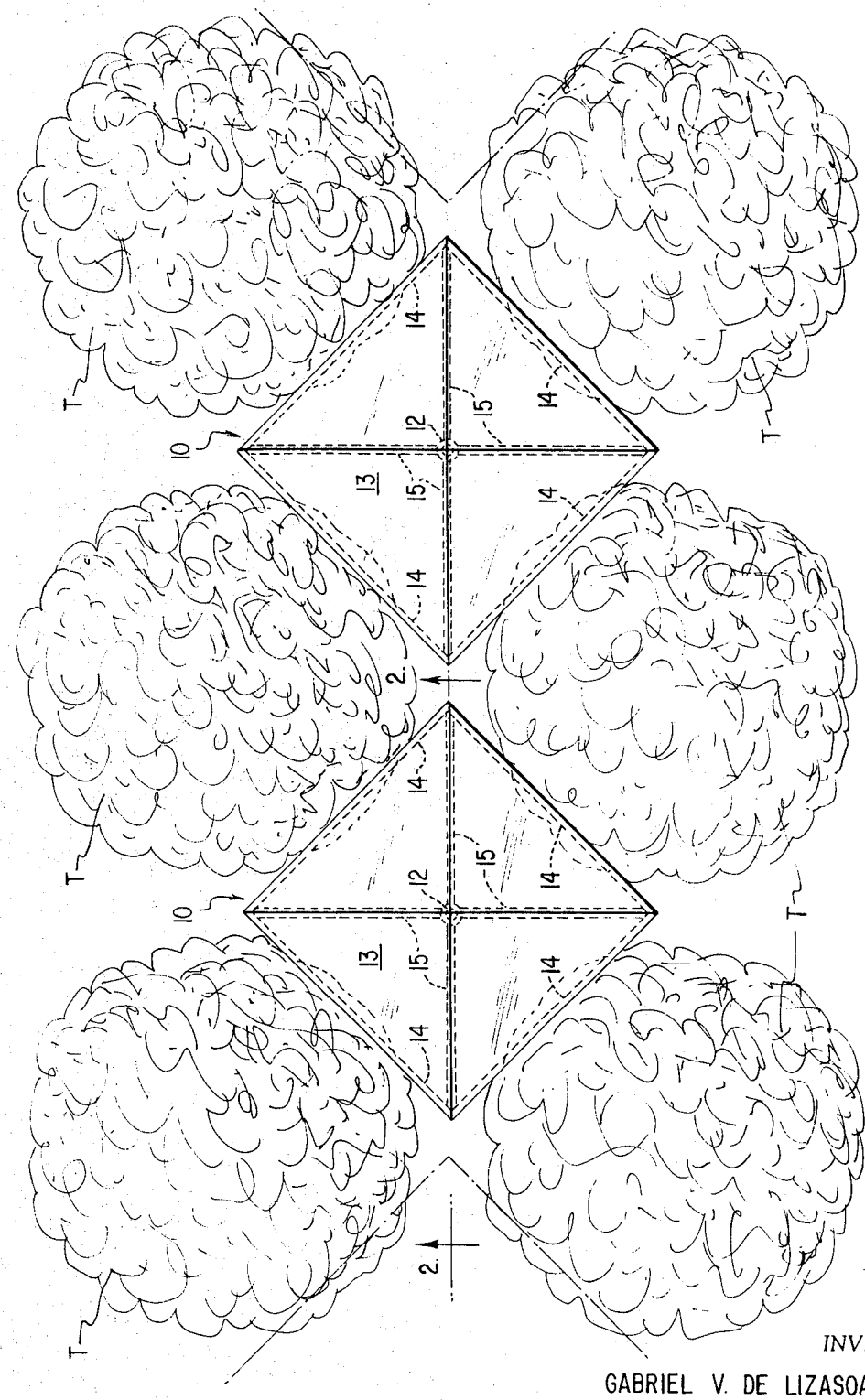
FIG. 1 is a top plan view of a portion of an orchard with thermal current barriers installed in accordance with my invention.
Figure 2:
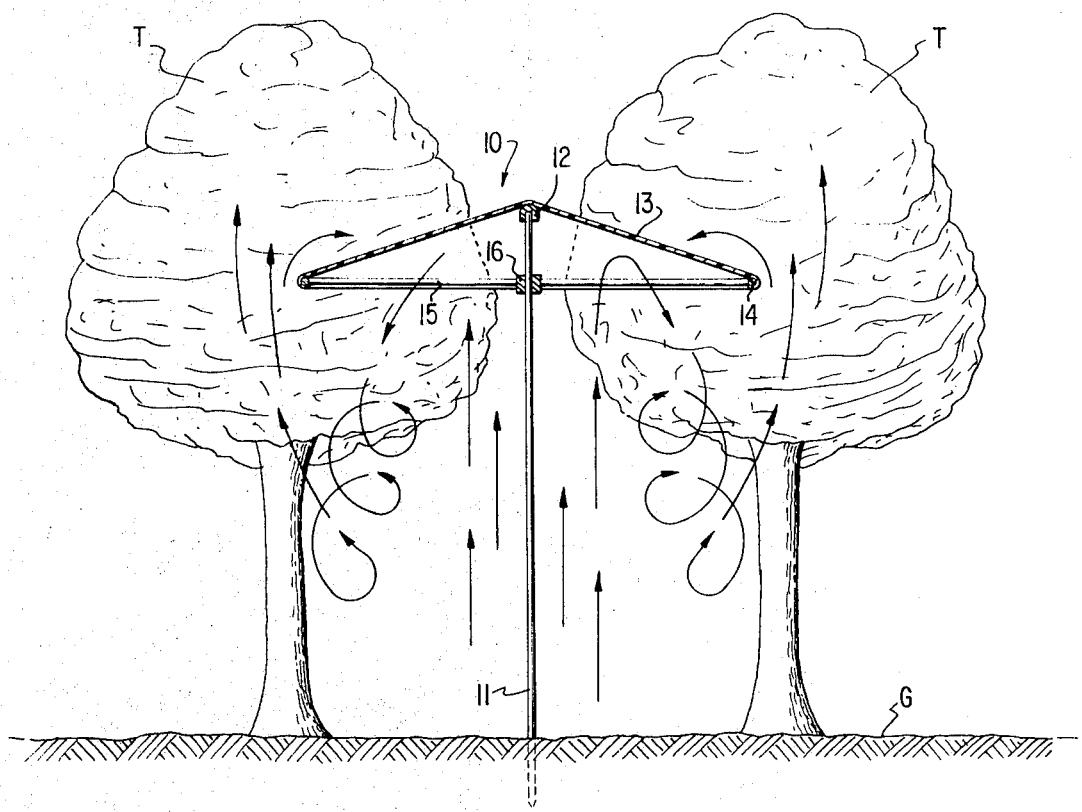
FIG. 2 is a sectional view on line 2—2 of FIG. 1.

A preferred form of thermal current barrier for use in the practice of my invention is shown in FIGS. 1 and 2. It comprises an umbrella-like unit 10 constituted of a center pole 11 pointed at its lower end and formed at its upper end to engage within a cap 12 that is fixedly attached to the under face of a substantially square canopy 13 at its center. The canopy is a sheet of flexible and transparent polyethylene attached at its side edges to the side rods 14 of a substantially square frame which, as shown in FIG. 1, has an area corresponding to the ground area over the normally open spaces between the trees adjacent its location. Opposite corners of the frame are connected by braces 15 which are fixed at the center of the frame to a guide collar 16 that is slidable over the center pole 11.

When the approach of a freeze is indicated, a pole 11 is driven into the ground G at the approximate center of each open space at the intersections of the lanes between the rows of the trees T. As shown in FIG. 2, the installed height of each pole is such that its top is disposed at a level somewhat above the level of maximum branch girth. A framed canopy is placed over the top of the pole by sliding the guide collar 16 down over the pole until the cap 12 seats on the pole top, whereupon the weight of the frame pulls the canopy down so that it assumes the shape of a shallow pyramid with its base at the approximate level of the maximum branch girth. The mounted canopy is then adjusted by rotation on the pole to position the corners substantially midway between their two adjacent trees, so that the side edges of the canopy are closely proximate the tips of the tree branches, with possibly some slight penetration of the foliage, at the level of the maximum branch girth. When fully installed, as seen in FIG. 1, the canopies serve together with the tree foliage to provide cover above substantially the entire ground surface of an orchard. The canopies are impervious to the passage of air and thus constitute barriers across the open air spaces between the trees and effectively prevent warm air from rising and cold air from descending through such open spaces.

As indicated by the arrows in FIG. 2, air rising beneath a barrier canopy is blocked and diverted downwardly so that it backs up and is forced laterally outward from the space beneath the canopy to penetrate the foliage of the adjacent trees and mingle with air rising naturally from the areas immediately beneath the overhang of their foliage. Because of the fact that air rising from the areas directly beneath the barriers is warmer and is moving faster and in greater volume than the air rising naturally from the areas directly under the overhang of the foliage, the warmer air diverted by the barrier canopies penetrates so forcibly into the foliage that it reaches to the vicinity of the trunks of the trees and in so doing mixes with and further warms the air rising naturally from the areas directly beneath the overhang of the foliage.

The heat conveyed in the higher temperature air diverted by the barriers is sufficient to insure that the overall temperature of the air mixture that ultimately rises through the foliage of the trees (its only channels of escape) is sufficient to prevent the formation of damaging frost on foliage with which it comes in contact. Otherwise stated: The heat conserving and retaining effect of my protective barriers is such that for the duration of any but the most exceptional of sudden, fortuitous periods of freeze the ambient air temperature from ground to tree top level in an orchard will never be so low that it will damage either the trees or their fruit. Furthermore, even in such exceptional cases, supplementary heat can be supplied at minimal cost by a few portable generators placed at strategic points beneath the barriers.

Conditions sometimes occur in which an orchard is subjected to an exceptionally sharp freeze of very short duration. In order to provide adequate protection for the trees under such conditions it may be necessary to further warm the upper portions of their foliage by directing the flow of warm air from beneath the barriers to penetrate directly into the foliage at levels higher than the level of penetration procurable with the form of barrier shown in FIG. 2 and at a faster rate. An alternative form of barrier, adapted to meet such contingencies, is shown by full lines in FIG. 3. It provides for movement of the canopy to selective positions of adjustment.

In this adjustable barrier the canopy cap 22 which seats on the top of the center pole 21 is a fixed collar that has pivotal connection with the inner ends of radial ribs 28 to which the canopy 23 is secured. Each rib has at substantially its midpoint a pivotal connection with the outer end of an arm 29 that is pivotally connected at its inner end to a collar 26 slidable on the center pole. The collar may be anchored at any desired height on the center pole by means of a setscrew 27.

Figure 3:
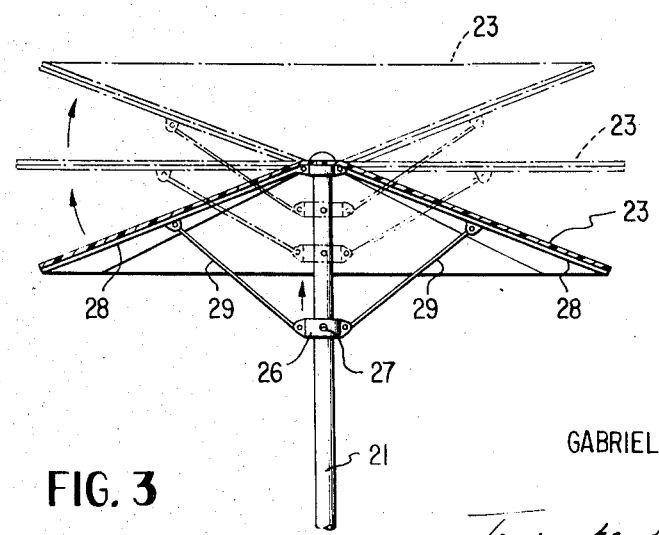
FIG. 3 is a vertical longitudinal section through an alternative form of the barriers, illustrating in full lines its normal arrangement and showing in phantom various positions or adjustment for regulating the direction and rate of air flow.

In the full line position shown in FIG. 3 the canopy 23 is in a normal use position disposed substantially in the shape and position of the canopy 13 in FIG. 1, and for the same purpose. When collar 26 is moved upwardly on the pole the arms 29 are operated to elevate the ribs 28 so that the canopy may assume an intermediate horizontal plane position or may take the shape of an inverted pyramid, as indicated in phantom. When the canopy is in the intermediate position the air rising beneath it will be diverted to penetrate the tree foliage at a level somewhat above the maximum branch girth and substantially perpendicular to the trunks of the trees, and the diverted air will penetrate the foliage faster than the rate at which it flows when the canopy is in normal use position.

When the canopy is adjusted to inverted pyramid position it will be at an angle which will deflect the rising air so that it will pass directly into the upper portions of the foliage and at a still faster rate, so that practically the full volume of air rising beneath the canopy will be made effective for maximum protection of those portions of the foliage which need it most.

A further alternative form of barrier is shown in FIGS. 4 and 5. In this arrangement no center pole is used. Instead, the canopy 33 is similar to the canopy 13 in FIG. 2 and is secured over a square frame which consists only of four side rods 34 connected at their corners by ribs 38 to a center support 32 carried by the canopy in the manner of the cap 12 in the FIG. 2 form; so that the barrier has the same shallow pyramid shape. The barrier is suspended between the trees by flexible slings 40 attached at their inner ends to the frame and secured at their outer ends to the adjacent tree trunks at approximately the level of the maximum branch girth.

A salient feature of my invention is the fact that, except for the outermost trees rimming an orchard, each tree receives the barrier-diverted air from four sides; so that the heat distribution is uniform throughout its foliage. Furthermore, the regarding effect of the barriers in conjunction with the spread of tree foliage maintains the air in contact with the sun heated ground surface for a much longer time than such contact could exist if the air rose unimpeded through the spaces between the trees. In consequence, maximum use is made of the ground heat which is always at a temperature higher than the air. The longer the air can be held in ground contact, the warmer it will be when it rises through the foliage of the trees.

I claim:

1. The method of environmentally air conditioning an orchard to obtain maximum use of its ambient air heat and humidity, which comprises: blocking the upward escape of air rising naturally by convection through empty spaces between the trees; and diverting the blocked air to penetrate and pass upwardly through the foliage of the trees instead of the empty spaces between them.

2. The method of environmentally air conditioning an orchard to obtain maximum benefit from its natural ambient air heat and humidity, which comprises: blocking the natural upward flow of air rising through empty spaces between the trees; diverting the blocked air so that it penetrates the foliage of the trees and mingles with air rising normally through the trees from areas directly underlying their foliage; and selectively regulating the rate at which the diverted air penetrates the foliage of the trees.

3. The method of conserving and utilizing the normal air and ground heat in an orchard to prevent the occurrence therein of a damaging frost environment, which comprises: placing portable thermal current barriers across substantially all the channels through which air might otherwise rise unimpeded by the foliage of the trees; and disposing the barriers substantially horizontally at a height that is below the level of the tops of the trees and above the level of their maximum branch girth.

4. The method of utilizing ground and air absorbed solar heat to prevent frost damage to trees in an orchard, which comprises: placing thermal current barriers above the ground surface outside the areas underneath the overhang of the trees, and disposing the barriers in a manner to divert the air rising thereunder so that it is constrained to escape upwardly through the foliage of the trees and at a rate slower than that at which it would rise through normally empty spaces between the trees.

5. In the method of claim 4, said barriers together with the tree foliage overlying substantially all the ground surface within the boundaries of the orchard.

References Cited

UNITED STATES PATENTS

| | | | |
|---|---|---|---|
| 657,966 | 9/1900 | Stewart | 47—20 |
| 1,380,033 | 5/1921 | Bagnall | 56—329 |
| 2,953,870 | 9/1960 | Nelson | 47—21 |
| 2,986,842 | 6/1961 | Toulmin | 47—58 |
| 3,206,892 | 9/1965 | Telkes et al. | 47—29 |

ROBERT E. BAGWILL, Primary Examiner

U.S. Cl. X.R.

135—20